United States Patent [19]
Pritchett

[11] 3,865,967
[45] Feb. 11, 1975

[54] FLUID PRESSURIZED ELECTRICAL CABLES HAVING MEANS INCORPORATED THEREWITH FOR LOCATING LEAKS

[75] Inventor: Jack Pritchett, Amersham, England

[73] Assignee: The Post office, London, England

[22] Filed: Apr. 23, 1973

[21] Appl. No.: 353,425

[30] Foreign Application Priority Data
May 5, 1972   Great Britain .................... 21131/72

[52] U.S. Cl. ............................ 174/11 R, 73/40.5 R
[51] Int. Cl..... H01b 7/32, H02g 15/28, G01m 3/28
[58] Field of Search..... 324/52, 54; 174/11 R, 15 C, 174/24, 70 R, 21 R; 73/40, 40.5 R, 49.1, 196; 340/242

[56] References Cited
UNITED STATES PATENTS

| | | | |
|---|---|---|---|
| 2,255,832 | 9/1941 | Thompson | 174/21 R X |
| 2,326,557 | 8/1943 | Peirce | 174/11 R |
| 2,433,505 | 12/1947 | Bennett et al. | 174/11 R |
| 2,803,692 | 8/1957 | Richards et al. | 174/11 R |
| 3,086,069 | 4/1963 | Kolmorgen | 174/11 R |

Primary Examiner—Laramie E. Askin
Attorney, Agent, or Firm—Kemon, Palmer & Estabrook

[57] ABSTRACT

A fluid filled cable is provided with a plurality of ducts, each of which may be connected at one end to a manometer, the other end of each duct being open to the inside of the cable. The open ends of the ducts are at spaced intervals along the length of the cable, and the manometers are positioned at a common point at which there is external access to the cable. If a localized leak occurs in the cable, the position of the leak can be found by noting the manometer readings and carrying out a graphical analysis.

5 Claims, 2 Drawing Figures

FLUID PRESSURIZED ELECTRICAL CABLES HAVING MEANS INCORPORATED THEREWITH FOR LOCATING LEAKS

The invention relates to fluid filled electric cables and especially to gas filled pressurised telecommunication cables.

The term "pressure" as herein used is to be construed as referring to pressure differences measured relative to a fixed pressure datum eg atmospheric pressure.

Telecommunication cables are often protected against the effect of external damage by a pressurisation system in which dry air is pumped into the cable core and maintained continuously at a pressure in excess of that of the atmosphere. By this means the likelihood of entry of water through the damaged sheath is very much reduced. When such damage occurs, the location of the damaged point in the sheath may be deduced by measuring the internal pressure at a number of predetermined points so as to enable the fault location to be determined by a graphical method. The accuracy of this method for fault location is largely dependent upon the number of points at which the pressure can be measured and, in practice, it is usual to choose the jointing points or amplifier locations at which the cable is easy of access as the measurement points for the internal pressure measurements. Because, with this method, the pressure measurements are generally made at different times, due to the spaced locations of the pressure measuring points, errors can be caused by differences in local atmospheric pressure.

In many cable routes, the joints are buried in the ground and are therefore not conveniently accessible. In such routes, access is only practicable at amplifier points and the spacing of these amplifiers is often too great to allow for an accurate fault location using the graphical method.

The present invention provides a fluid filled cable with a plurality of ducts or conduits. Each duct has one end adapted for connection to a manometer at a point in the cable which is externally accessible. The other ends of the ducts are open to the inside of the cable at spaced intervals along the lengths of the cable. If a localised leak occurs in the cable, the leak can be located by simultaneously measuring the pressure in the various ducts using manometers connected to the ducts. From the measured pressures the position of the leak may be determined graphically.

It is an object of the invention to provide a cable in which the position of any leaks may be determined by pressure measurements made at a single location.

It is also an object of the invention to provide a method of locating localised leaks in a fluid filled cable by pressure measurements performed at a location remote from the point at which the measured pressure is extant. According to the present invention there is provided a fluid filled electric cable comprising a fluid containing sheath, a plurality of pressure transmitting ports disposed within said sheath at points separated axially of the cable, each of said ports connected to a pressure transmitting duct having a fluid impermeable wall, each of said ducts having an externally accessible end at a location common to all the ends of said ducts.

Preferably said ducts are disposed within said fluid containing sheath.

According to a second aspect of the invention there is provided a method of detecting and locating leak faults in a pressurized cable in which there is a localised leak at a position to be determined including the steps of:

a. measuring, from a first location, a first pressure at a second location remote from said first location
b. measuring a second pressure at a third location remote from said second location
c. determining, from said first and second pressures, the position of said leak. An embodiment of the invention will now be described, by way of example only, with reference to the accompanying diagrammatic drawings in which.

Figure 2:
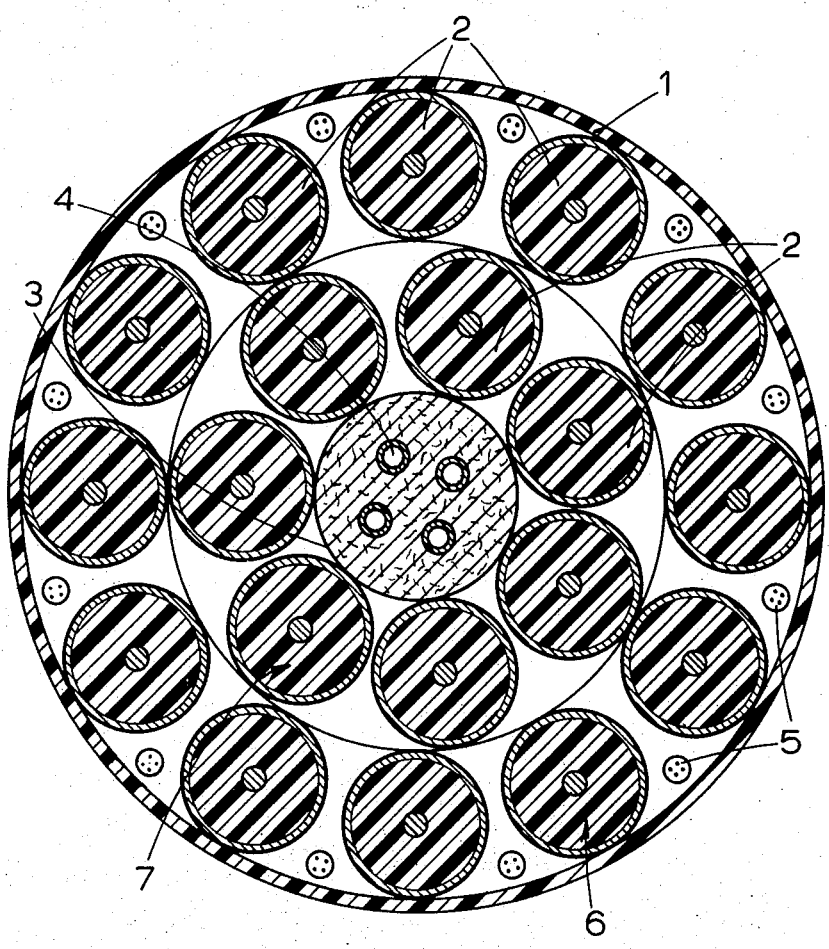
FIG. 2 shows a cross-section of a telecommunication cable comprising coaxial conductors, interstitial quads and pressure monitoring ducts.

Referring now to FIG. 2 the cable consists of an outer sheath 1 of polyethylene within which there are two concentric rings of coaxial cables 2 formed around an inner porous paper core 3 including small bore ducts 4. A number of four core lines, known as quads 5, are located at the interstices of the outer ring 6 of the coaxial cables 2. There are seven coaxial cables 2 forming an inner ring 7 which are wound around the core 3 with a slight twist of the opposite hand to the 12 coaxial cables 2 forming the outer ring 6.

The sheath 1 acts as a pressure retaining sheath, damage to which may be monitored with the aid of the small bore ducts 4. The ducts may be of plastic material having sufficient rigidity to withstand the pressure in the cable but sufficiently flexible to resist damage when the cable is coiled and uncoiled. A suitable material for the ducts is copper tube polyethylene or polypropylene. The copper ducts may be insulated one from the other so that they can be used as current conductors.

Figure 1:
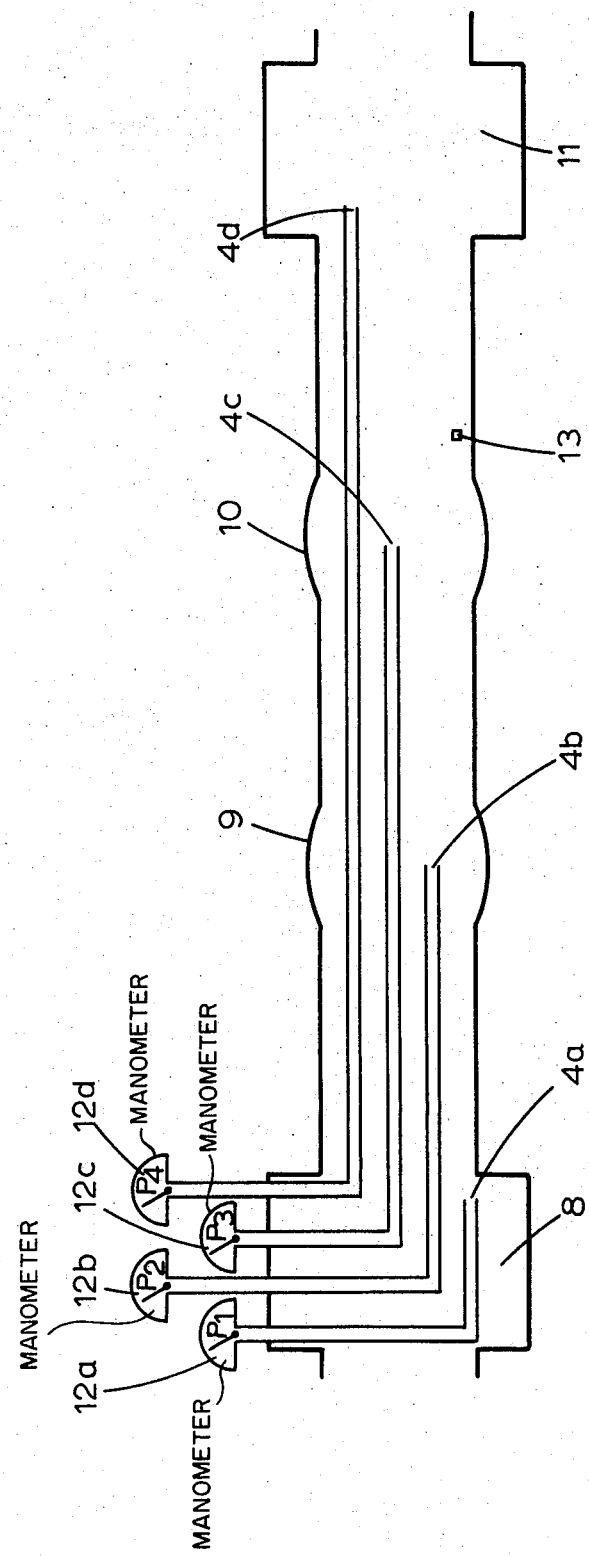
FIG. 1 shows diagrammatically a length of cable constructed according to the invention.

Referring now to FIG. 1, the cable shown in FIG. 2 is, in FIG. 1, shown diagrammatically indicating only the sheath 1 and small bore ducts 4. As will be seen from FIG. 1 the ducts 4 have pressure transmitting ports, i.e., are open to the fluid, within the sheath at a first amplifier location 8, a first joint location 9, a second joint location 10, and a second amplifier point 11. The ducts for measuring the pressure at the locations 8, 9, 10 and 11, which may advantageously be equi-spaced, will be given the reference numerals $4a$, $4b$, $4c$ and $4d$ respectively. The ducts $4a$, $4b$, $4c$, and $4d$ are brought out from the end of the cable at the amplifier location 8 and are terminated in manometers $12a$, $12b$, $12c$, and $12d$ respectively. The manometers can be the U-tube or bourdon-gauge type.

The cable is filled with dry air at a pressure greater than atmospheric pressure. The pressure at the locations 8, 9, 10 and 11 may be accurately determined at the location 8, providing the ducts do not completely collapse under a pressure equal to that of the air in the cable. The invention allows simultaneous measurements of pressure at the spaced locations along the cable without the use of elaborate transducers and electrical monitoring equipment thereby facilitating the location of faults in the cable sheath.

Assuming that there is damage to the cable sheath 1 at a point 13 between locations 10 and 11 which allows the egress of gas from the pressurised cable, then there will be a pressure drop which will be monitored at each of the pressure monitoring locations along the cable. However, due to the pressure drop along the cable, the pressures monitored at the various locations will differ and from an inspection of the pressure gauges 12a, 12b, 12c, and 12d it may be determined between which pressure monitoring locations the fault has occurred, and by a known graphical method the exact location may be reasonably accurately deduced.

Although in FIG. 1 the ducts 4 are shown as terminating at the locations 8, 9, 10 and 11, it will be appreciated that in practice when the cable is being manufactured, the ducts within the core 3 (shown in FIG. 2) may be continuous throughout the cable. Although generally the ducts will be open to the fluid only at the end of a manufactured length of cable, it will be appreciated that, if necessary, the duct may be opened at spaced locations along the cable length.

It will be appreciated that the invention is applicable to power cables and that the pressure monitored may be created by the fault. That is to say, the cable may be at a negative pressure relative to atmospheric pressure, or, in the case of power cables, local over-heating of the cable at a particular location may be arranged to generate a gas which creates a pressure sufficient to indicate on the monitoring gauges at a remote location.

For normal flow along a cable the pneumatic resistance will be uniform with length and the flow lines will be parallel with the axis of the cable. Thus for a complete cut in the cable it would, indeed, be valid to join the measured points by straight lines. But for a small sheath defect—whether it be a circumferential crack or a small rupture at one point—the air flow near the defect will no longer be entirely parallel to the axis of the cable and therefore the pneumatic resistance at right angles to the axis comes into the picture. In general, having regard to the construction of a typical coaxial cable, the pneumatic resistance at right angles to the axis is higher than that along the axis. Thus for a more accurate location, it is necessary to guage the size of the defect by measuring the rate of leakage of air. For a particular type of cable it is possible to determine experimentally a family of pressure curves covering a whole range of sheath sizes and fault locations. If these are made in transparent form they can be used as overlays for the pressure diagram measured in a given field situation. The one that gives the best fit is then used to locate the fault.

What is claimed is:

1. A fluid filled electric cable in which a leak at any point in the cable causes a continuous pressure gradiant drop along the entire cable, said cable comprising a fluid containing sheath, a plurality of fluid impermeable pressure transmitting conduits disposed within said sheath, said conduits each having an open end located within said sheath, said open ends being spaced from one another along the length of said sheath, the other end of each conduit terminating externally of said sheath, and a plurality of individual pressure indicating means, each said other end of said conduits being connected to a respective one of said individual pressure indicating means for indicating the individual pressure at said open end of each conduit.

2. A fluid filled electric cable as set forth in claim 1 wherein each said pressure indicating means constitutes a manometer.

3. A fluid filled electric cable as set forth in claim 1 in which said open ends are equi-spaced one from the other.

4. A fluid filled electric cable as claimed in claim 3 in which said fluid is a dry gas at a pressure greater than atmospheric pressure.

5. A fluid filled electric cable as set forth in claim 4 in which said conduits form electrically conductive paths along the cable.

* * * * *